United States Patent [19]
Sasaki et al.

[11] Patent Number: 5,353,231
[45] Date of Patent: Oct. 4, 1994

[54] METHOD OF FABRICATING A REFLECTING MIRROR SUCH THAT MIRROR SEGMENTS CAN BE ARRANGED TO REDUCE THE EFFECTS OF THERMAL DEFORMATION

[75] Inventors: Aki Sasaki; Izumi Mikami; Kouki Asari, all of Hyogo, Japan

[73] Assignee: Mitsubishi Denki Kabushiki Kaisha, Tokyo, Japan

[21] Appl. No.: 180,504

[22] Filed: Jan. 12, 1994

Related U.S. Application Data

[63] Continuation-in-part of Ser. No. 854,478, Mar. 17, 1992, abandoned.

[30] Foreign Application Priority Data

Jul. 11, 1991 [JP] Japan .................. 3-196115

[51] Int. Cl.$^5$ ............................................ G06F 15/46
[52] U.S. Cl. .................................. 364/473; D16/132
[58] Field of Search ............... 364/473; 359/846–849, 359/850–867; 356/247, 445–448; D16/132

[56] References Cited

U.S. PATENT DOCUMENTS

| | | | |
|---|---|---|---|
| 4,287,421 | 9/1981 | DeBaryshe et al. | 250/423 P |
| 4,484,798 | 11/1984 | Howden | 350/601 |
| 4,850,708 | 7/1989 | Moore et al. | 356/350 |
| 5,085,497 | 2/1992 | Um et al. | 359/848 |
| 5,096,281 | 3/1992 | Windebank et al. | 359/868 |
| 5,168,673 | 12/1982 | Nemir et al. | 51/1 |

FOREIGN PATENT DOCUMENTS 3739841 1/1989 Fed. Rep. of Germany .
4039878 10/1991 Fed. Rep. of Germany .

OTHER PUBLICATIONS

Krim et al., "Accommodating CTE Discontinuities in a ULE Mosaic Mirror", SPIE vol. 1236 Advanced Technology Optical Telescopes IV (1990), pp. 605–614.

*Primary Examiner*—Jerry Smith
*Assistant Examiner*—Cameron H. Tousi
*Attorney, Agent, or Firm*—Rothwell, Figg, Ernst & Kurz

[57] ABSTRACT

The present invention relates to a method of fabricating a reflection mirror formed by sticking together a plurality of mirror segments for use on a reflecting telescope or the like. The mirror segments are arranged so that the thermal deformation of the reflecting mirror is limited to the least possible extent. The method comprises steps of: setting a plurality of sample points on the mirror surface; developing a matrix connecting a coefficient of the thermal expansion (CTE) vector having the deviations of the respective CTEs of the mirror segments from the average CTEs obtained by averaging the CTEs of the mirror segments as components corresponding to the respective positions of the mirror segments with the displacements of the sample points; selecting a vector making the sum of squares of the displacements a minimum among those obtained by rearranging the components of the CTE vector; and arranging the mirror segments according to the positions of the components of the selected vector.

9 Claims, 7 Drawing Sheets

METHOD OF FABRICATING A REFLECTING MIRROR SUCH THAT MIRROR SEGMENTS CAN BE ARRANGED TO REDUCE THE EFFECTS OF THERMAL DEFORMATION

This is a continuation-in-part of application Ser. No. 07/854,478, filed Mar. 17, 1992 now abandoned.

BACKGROUND OF THE INVENTION

1. Field of the Invention

The present invention relates to a method of fabricating a reflecting mirror for a reflecting telescope and, more specifically, to a method of fabricating a reflecting mirror for a reflecting telescope, consisting of mirror segments arranged and stuck together so that the thermal deformation of the reflecting mirror attributable to the difference in coefficient of thermal expansion (hereinafter CTE) between the component mirror segments is reduced to a minimum.

2. Description of the Prior Art

FIG. 1 is a perspective view of a reflecting mirror formed by sticking mirror segments together. A reflecting mirror as shown in FIG. 1 (b) is formed by sticking together a plurality of hexagonal mirror segments (hereinafter referred to as "stacks") 2, such as shown in FIG. 1(a). The surface of the reflecting mirror 1 is finished by polishing in, for example, a paraboloid or a hyperboloid in an accuracy on the order of 1/100 of the observation wavelength to reflect and focus an electromagnetic wave, such as visible light and infrared rays. If the surface of the reflecting mirror 1 is finished in a perfect paraboloid, the incident electromagnetic wave emitted by a celestial body is converged on a single point (the focus). Practically, the incident electromagnetic wave is not focused in an image having a diameter virtually equal to zero due to the diffraction of light, and there is a theoretical limit in the diameter of the image, determined by the aperture D of the reflecting mirror and the wavelength $\lambda$ of the incident electromagnetic wave.

FWHM (full width at half maximum) in the theoretical limit image, in general, is expressed by $$\text{FWHM} = 1.02 \times (\lambda/D) \text{ rad} = 2.1 \times 10^5 \times (\lambda/D) \text{ arcsec} \quad (1)$$

FWHM is the width between two values on the horizontal axis of a graph showing a light intensity distribution curve, for which light intensity is one-half the maximum light intensity as shown in FIG. 2. Accordingly, a theoretical limit in the size of the image of a star is dependent on the aperture D of the reflecting mirror 1 and the wavelength $\lambda$ of the incident electromagnetic wave. That is, theoretical limit is smaller and light gathering power is higher when the aperture D is larger. Accordingly, increase in the aperture of the reflecting mirror 1 enables reduction in size of the image and hence is a significant contribution to the improvement of resolution, the improvement of limit of detection and reduction in exposure time.

However, in practice, the reflecting mirror 1 is subject to thermal deformation according to temperature variation because the CTES of the stacks 2 are not zero. If all the stacks 2 are the same in thermal expansion coefficient, only the focus of the reflecting mirror 1 may be changed by the change of temperature and the image quality is not deteriorated because the shape of each stack 2 before thermal change and that of the same after thermal change are similar. However, in practice, the stacks 2 differ from each other in CTE, the reflecting mirror 1 is subject to irregular thermal deformation.

Since the number of the component stacks 2 of the reflecting mirror 1 increases with the aperture D of the reflecting mirror 1, the irregularity in thermal deformation of a larger reflecting mirror is more complex, and slight tilt of the reflecting mirror due to thermal deformation causes a significant thermal deformation of the same. Thus, if thermal deformation occurs in the reflecting mirror, incident light received from a celestial body is scattered to form a blurred image having a light intensity distribution as indicated by continuous line in FIG. 3(b) and, consequently, it is impossible to make most of the foregoing advantages of increase in the aperture of the reflecting mirror 1.

One kind of inhomogeneity in the respective CTES of the stacks 2 that cause the irregular thermal deformation of the reflecting mirror is the difference between the stacks 2 in the gradient of CTE with respect to the direction of thickness of the stacks 2, which cause a bimetal effect, and another kind is the difference between the stacks 2 in average CTE. A prior art method proposed to suppress the thermal deformation to the least extent arranges stacks as shown in FIG. 4.

In FIG. 4, $\Delta\alpha_1$ to $\Delta\alpha_{37}$ ($\Delta\alpha_1 \geq \Delta\alpha_2 \geq \ldots \Delta\alpha_{37}$) are the deviations of the respective average CTEs of stacks 2 from the average of the CTEs of all the stacks 2. The stacks 2 are classified into three groups, namely, a group of those having larger deviations (represented by segments shaded by crossing oblique lines), a group of those having middle deviations (represented by segments shaded by dots) and a group of those having smaller deviations (represented by blank segments).

This prior art method arranges the stacks 2 of different groups as shown in FIG. 4, in which stacks 2 included in the group of stacks 2 having middle deviations and stacks 2 included in the group of stacks having smaller deviations are arranged around each stack 2 included in the group of stacks having larger deviations. This arrangement relaxes the large thermal expansion of the stack 2 having a large deviation to some extent by the relatively small thermal expansions of the stacks 2 surrounding the former to limit deformation of the reflecting mirror 1 to local deformation. The deformation of the reflecting mirror formed by arranging the stacks in this arrangement by the prior art method is expected intuitively to be far smaller than that of a reflecting mirror in which the distribution of the CTEs of the stacks is localized.

FIG. 5 is a sectional view of a reflecting mirror provided with actuators for correcting thermal deformation. Temperature sensors 3 are attached to the backside of the reflecting mirror 1, a data processing unit 4 calculates correcting forces on the basis of the temperature of the reflecting mirror 1 measured by the temperature sensors 3, and an actuator controller 5 controls actuators 6 to apply appropriate correcting forces to the reflecting mirror 1 to correct the thermal deformation of the same.

If it is desired to correct the thermal deformation perfectly by the actuators 3, irregularities of small pitches must be corrected, which requires a large force for correction and hence is practically impossible. Accordingly, the deformation is expanded in a series of finite or infinite terms as a function of spatial frequency, and only the terms having large pitches of irregularity are corrected. The residual deformation of the mirror surface due to irregularities of small pitches which have not been corrected deteriorates the quality of the image.

FIG. 6 shows an arrangement of stacks entailing intuitive expectation that thermal deformation occur locally in the terms having large pitches of irregularity in correcting only the terms having large pitches of irregularity. In FIG. 6, $\Delta \alpha hd\ 1$ to $\Delta \alpha_{37}$ of the stacks 2 correspond respectively to those of the stacks 2 shown in FIG. 4.

Since the prior art reflecting mirror is thus fabricated, in which the arrangement of the stacks is determined intuitively. Accordingly, such an arrangement of stacks is not necessarily effective for reducing the thermal deformation to the least extent.

SUMMARY OF THE INVENTION

Accordingly, it is an object of the present invention to provide a method of fabricating a reflecting mirror, capable of reducing the thermal deformation of the reflecting mirror or the residual thermal deformation remaining in the reflecting mirror after correcting the thermal deformation by expanding the thermal deformation in a series of modes which are functions of spatial frequency to the least extent.

In one aspect of the present invention, a method of fabricating a reflecting mirror consisting of a plurality of stacks develops a matrix expressing the relation between the displacement vector having as components displacement values of a plurality of sample points on the mirror surface of a reflecting mirror and the CTE vector having the respected deviations of the average CTEs of the respected stacks from the average CTE of all the stacks as components corresponding respectively to the position of the stacks, calculates the eigenvectors of a symmetric matrix corresponding to the product of the above matrix and the transposed matrix obtained by transposing the former, calculates the sum of squares of displacements when the components of the CTE vector are arranged in a descending order in correspondence to the descending order or the ascending order of the components of the eigenvector of the symmetric matrix, and arranges and sticks together the stacks according to the components of the CTE vector that make the sum of squares of the displacements minimum.

In another aspect of the present invention, a method of fabricating a reflecting mirror consisting of a plurality of stacks expands the thermal deformation of the reflecting mirror in a series of modes which are function of spatial frequency, develops a matrix expressing the relation between the residual displacement vector having as components residual displacement values remaining after the correction of predetermined terms of the series and the CTE vector having the deviations of the average CTEs of the respected stacks from the average CTE of all the stacks as components corresponding to the positions of the stacks, calculate the eigenvectors of a symmetric matrix corresponding to the product of the above matrix and transposed matrix obtained by transposing the former, calculates the sum of squares of the components of the residual displacement vector when the components of the CTE vector are arranged in a descending order in correspondence to the descending order or the ascending order of the components of the eigenvector of the symmetrical matrix, and arranges and sticks together the stacks according to the components of the CTE vector so that the sum of square of the components of the vector of the residual vector is minimum.

DETAILED DESCRIPTION OF THE PREFERRED EMBODIMENTS

Figure 7:
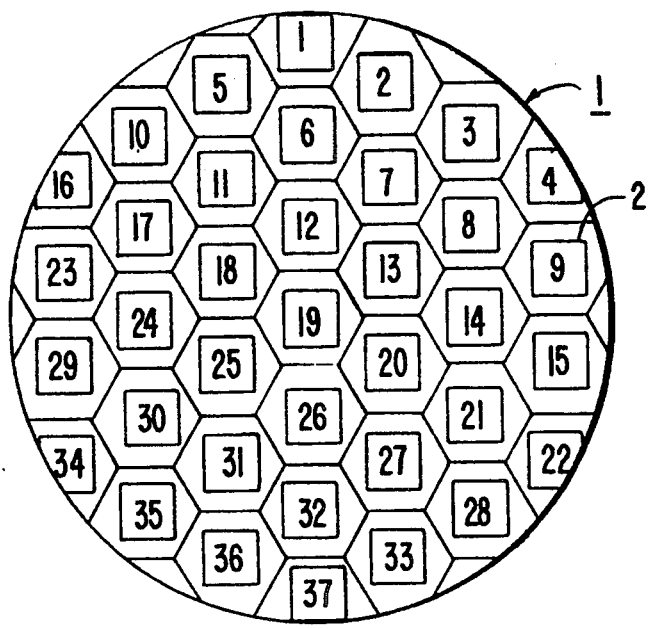
FIG. 7 is a plan view showing the arrangement position number of the stacks of a reflecting mirror.

FIG. 7 is a plan view of a reflecting mirror 1 consisting attached to thirty-seven stacks 2, in which numerals 1 to 37 marked on the stacks 2 are the numbers of the positions of the stacks 2 in the reflecting mirror 1 and do not represent average CTES.

Figure 8:
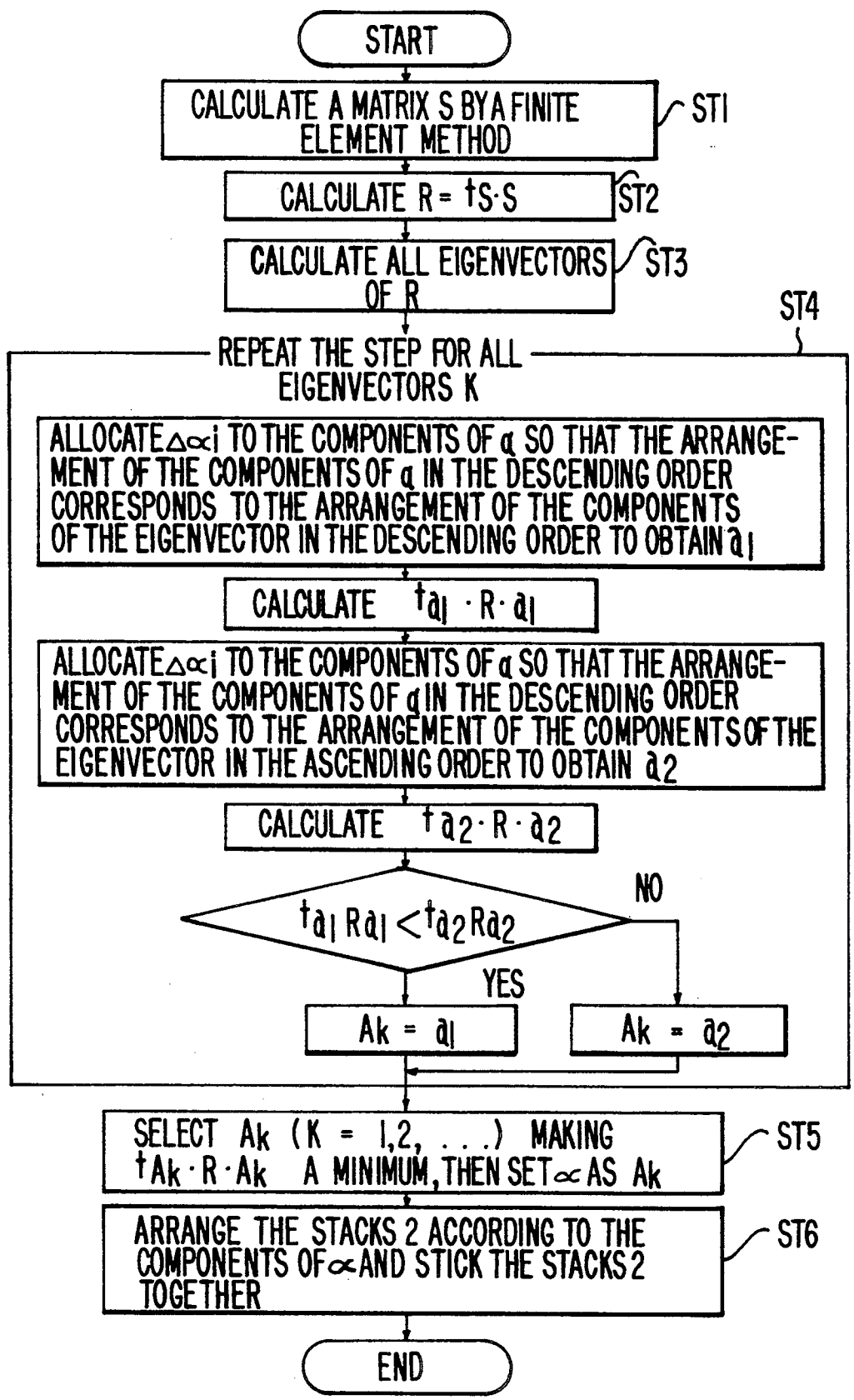
FIG. 8 is a flow chart of assistance in explaining steps of a method of fabricating a reflecting mirror in a first embodiment according to the present invention.

A method of fabricating a reflecting mirror in a first embodiment according to the present invention will be described hereinafter with reference to a flow chart shown in FIG. 8. In the following description, $\Delta \alpha_i$, $(i=1, 2, \ldots, 37; \Delta \alpha_1 \geq \Delta \alpha_2 \geq \ldots \geq \Delta \alpha_{37})$ is the deviation of the average CTEs of the i-th stack 2 from the average of CTEs of the thirty-seven stacks 2 (hereinafter, Ⓐ). The positions of stacks 2 are determined by allocating $\Delta \alpha_i$ to $\alpha_j$, respectively. Now we assume thermal displacement sample points, assuming one thousand points here, are distributed at almost equal intervals on the mirror surface of the reflecting mirror 1, and the displacements of the sample points are represented by $\Delta Z_k$ (k=1, 2, ..., 1000). When the $\alpha_j$ (j=1, 2, ..., 37) are given, the displacements $\Delta Z_k$ of the sample points for a temperature variation $\Delta T$ can be calculated by a finite element method. Therefore, the relation between $\alpha_j$ (j=1, 2, ..., 37) and the displacements $\Delta Z_k$ (k=1, 2, ..., 1000) can be expressed by a 1000×37 matrix S which is independent of the values of $\alpha_j$.

$$\begin{vmatrix} \Delta Z_1 \\ \Delta Z_2 \\ \cdot \\ \cdot \\ \cdot \\ \Delta Z_{1000} \end{vmatrix} = [S] \begin{vmatrix} \alpha_i \\ \alpha_2 \\ \cdot \\ \cdot \\ \cdot \\ \Delta \alpha_{37} \end{vmatrix} \times \Delta T \quad (2)$$

Values on the first row can be calculated as displacement vector ($\Delta Z_1, \Delta Z_2, \ldots, \Delta Z_{1000}$) when the vector of CTEs ($\alpha_1, \alpha_2, \ldots, \alpha_{37}$) are $(1, 0, \ldots, 0)$ and $\Delta T = 1°$ C. by the expression (2). Similarly, values on all the rows can be determined by calculating $\Delta Z_k$ ($k = 1, 2, \ldots, 1000$) when ($\alpha_1, \alpha_2, \ldots, \alpha_{37}$) = $(0, 1, 0, \ldots, 0)$, $(0, 0, 1, 0, \ldots, 0)$, and so on. Thus, values on the rows of the matrix S can be calculated (step ST1).

The displacement vector U and the CTE vector $\alpha$ are defined by the following expression.

$$U = \begin{vmatrix} \Delta Z_1 \\ \Delta Z_2 \\ \cdot \\ \cdot \\ \cdot \\ \Delta Z_{1000} \end{vmatrix}, \alpha = \begin{vmatrix} \alpha_i \\ \alpha_2 \\ \cdot \\ \cdot \\ \cdot \\ \Delta \alpha_{37} \end{vmatrix} \quad (3)$$

Therefore, substituting the expression (3) in the expression (2), we obtain $$U = S \cdot \alpha \cdot \Delta T \quad (4)$$

The magnitude of deformation can be evaluated, in general, by the rms (root mean square) of the deformations. Therefore, $$rms = \sqrt{\sum_{k=1}^{1000} (\Delta Z_k)^2 / 1000} \quad (5)$$

From the expression (5), it is obvious that the rms is a minimum if the sum of square of the displacements $\Sigma(\Delta Z_k)^2$ ($k = 1, 2, \ldots, 1000$) is a minimum. The sum of square of the displacements can be expressed by $$\sum_{k=1}^{1000} (\Delta Z_k)^2 = ||U||^2 = {}^t U \cdot U = {}^t(S \cdot \alpha \cdot \Delta T)(S \cdot \alpha \cdot \Delta T) \quad (6)$$
$$= {}^t \alpha \cdot {}^t S \cdot S \cdot \alpha \cdot (\Delta T)^2$$

where $||U||^2$ is the square of the norm of the displacement vector U, and the index "t" indicates a transposed matrix.

It is known from the expression (6) that the thermal deformation can be reduced to a minimum when the value of ${}^t\alpha \cdot {}^tS \cdot S \cdot \alpha$ is reduced to a minimum. When ${}^tS \cdot S$ is expressed by a matrix R, the matrix R is a $37 \times 37$ symmetric matrix independent of the CTE vector $\alpha$ (step ST2). Therefore, an optimum arrangement of the stack 2 can be determined by determining the arrangement of the CTE value of each stack $\Delta \alpha_1, \Delta \alpha_2, \ldots, \Delta \alpha_{37}$, as the components of the CTE vector $\alpha$ so that $||U||^2 = {}^t\alpha \cdot R \cdot \alpha$ is a minimum.

The arrangement of the components of the CTE vector $\alpha$ to make $||U||^2$ a minimum will be described hereinafter. $||U||^2$ has a quadratic form and hence the value of $||U||^2$ is a minimum when the thermal expansion coefficient vector $\alpha$ is parallel to the eigenvector of the symmetric matrix R. However, since the CTE vector $\alpha$ can be changed only in the range of rearrangement of the components, the CTE vector of which direction is nearest to the direction of the eigenvector of the symmetric matrix R is selected as an optimum one among CTE vectors given by rearranging the components.

The CTE vector $\alpha$ of which direction is nearest to the direction of the eigenvector of the symmetric matrix R can be obtained by using inner product.

Suppose that an eigenvector of the symmetric matrix R is x, and the angle between the eigenvector of the symmetric matrix R and CTE vector $\alpha$ is $\theta$. Then the CTE vector $\alpha$ so that corresponding angle $\theta$ is nearest to 0 or $\pi$ may be selected. Now, since $$(\alpha, x) = |\alpha| |x| \cos \theta$$

where ($\alpha$, x) is inner product, the CTE vector $\alpha$ nearest to the eigenvector x makes inner product ($\alpha$, x) a maximum or a minimum. Such an arrangement can be determined in the following manner.

[Lemma] (Maximization of inner product by the rearrangement of the components) An arrangement that gives a maximum for inner product ($\alpha$, x) is an arrangement of $\Delta \alpha$; in the descending order corresponding to the arrangement of the components of the eigenvector x of the symmetric matrix R in the descending order. In arranging the CTE vectors $\alpha$, the largest CTE, $\Delta \alpha_i$, is placed at the position of the component of the vector $\alpha$ corresponding to the position of the component of the x the largest component of the x is placed, and then the nth largest CTE $\Delta \alpha_n$ (n = 2 to 37) is placed at the position corresponding to the position of the nth largest component [Proof] The CTE vector $\alpha$ is formed by arranging $\Delta \alpha_i$ in the descending order so as to correspond to the descending order of the components of the eigenvector x of the symmetric matrix R.

$$\alpha = \begin{vmatrix} \alpha_1 \\ \alpha_2 \\ \cdot \\ \cdot \\ \cdot \\ \alpha_{37} \end{vmatrix}, X = \begin{vmatrix} X_1 \\ X_2 \\ \cdot \\ \cdot \\ \cdot \\ X_{37} \end{vmatrix} \quad (7)$$

[Inner product $(\alpha, x) = \alpha_1 X_1 + \alpha_2 X_2 + \ldots + \alpha_{37} X_{37}$]

In the expression (7), if, for example, $x_{10}$ is the largest among $x_n$ (n = 1 to 37), the largest CTE, $\Delta \alpha_i$, is allocated to $\alpha_{10}$. If $x_5$ the largest next to $x_{10}$, the second largest CTE, $\Delta \alpha_2$, is allocated to $\alpha_5$. Now, we are going to consider optional two terms of inner product $\alpha_i x_i + \alpha_j x_j$, where we assume as follows, $$\alpha_j = \alpha_i - \alpha' \quad (\alpha' \geq 0)$$

$$x_j = x_i + x' \quad (x' \geq 0)$$

Since the descending order of the components of x corresponds to the descending order of the components of $\alpha$, $x_j$ is necessarily smaller than $x_i$ if $\alpha_j$ is smaller than $\alpha_i$, and hence such definition is possible. When two components of $\alpha$ are replaced, the two terms are $\alpha_j x_i + \alpha_i x_j$. Then, $$(\alpha_j x_i + \alpha_i x_j) - (\alpha_i x_i + \alpha_j x_j) = \{(\alpha_i - \alpha') x_i + \quad (8)$$

-continued
$$a_j(X_i - X')\} - \{a_iX_i + (a_j - a')(X_i - X')\} = -a'X' \leq 0$$

As shown by the above, the inner product is decreased whenever the two component orders of $\alpha$ are exchanged from the original orders. Therefore, the inner product becomes maximum by arranging $\Delta\alpha_i$ in the descending order so as to correspond to the descending order of the components of the eigenvector of the symmetric matrix R.

[Lemma] (Minimization of inner product by the rearrangement of the components) In correspondence to the arrangement of the components of x in the ascending order, $\Delta\alpha_i$ are arranged in the descending order to make inner product $(\alpha, x)$ a minimum. That is, the largest CTE $\Delta\alpha$; is placed at the place of the component of the vector $\alpha$ corresponding to the place of the smallest component among those of x. Similarly, the nth largest CTE, $\Delta\alpha_n$ (n=2 to 37) is placed at the position corresponding to the position of the nth smallest component among those of x.

[Proof] The CTE vector $\alpha$ is formed by arranging $\Delta\alpha_i$ in a descending order so as to correspond to the ascending order of the components of the eigenvector x of R.

$$\alpha = \begin{vmatrix} \alpha_1 \\ \alpha_2 \\ \cdot \\ \cdot \\ \cdot \\ \alpha_{37} \end{vmatrix} \quad X = \begin{vmatrix} X_1 \\ X_2 \\ \cdot \\ \cdot \\ \cdot \\ X_{37} \end{vmatrix} \tag{9}$$

[Inner product $(\alpha, X) = \alpha_1X_1 + \alpha_2X_2 + \ldots + \alpha_{37}X_{37}$]

In the expression (9), if, for example, $x_{10}$ is the smallest among $x_n$ (n=1 to 37), the largest CTE, $\Delta\alpha_1$, is allocated to $\alpha_{10}$. If $x_5$ is the second smallest, the second largest CTE $\Delta\alpha_2$, is allocated to $\alpha_5$. Now, we are going to consider two optional terms of the inner product $\alpha_iX_i+\alpha_jX_j$, where we can assume $$\alpha_j = \alpha_i - \alpha' \quad (\alpha' \geq 0)$$

$$x_j = x_i + x' \quad (x' \geq 0)$$

since the ascending order of the components of x corresponds to the descending order of the components of $\alpha$, $x_j$ is necessarily larger than $x_i$ if $\alpha_j$ is smaller than $\alpha_i$. When the two components of $\alpha$ are replaced, the two terms are $$\alpha_jx_i + \alpha_ix_j$$

and $$(\alpha_jX_i + \alpha_iX_j) - (\alpha_iX_i + \alpha_jX_j) = \{(\alpha_i - \alpha')X_i +$$
$$(\alpha_i(X_i + X')\} - \{(\alpha_iX_i + (\alpha_i - \alpha')(X_i + X')\} = \alpha'X' \geq 0$$

As shown by the above, the inner product is increased whenever the two component orders of $\alpha$ are exchanged from the original orders. Therefore, the inner product becomes minimum by arranging $\Delta\alpha_i$ in the descending order so as to correspond to the ascending order of the components of the eigenvector of symmetric matrix R.

Accordingly, an optimum arrangement can be determined from those two lemmas by the following procedure.

(1) The components of $\alpha$ are arranged in the descending order in correspondence to the arrangement of the components of x in the descending order. The nth largest component of $\alpha$ i.e. $\Delta\alpha_n$ is placed at the position corresponding to the position of the nth largest component of x to form the vector $a_1$.

(2) The components of $\alpha$ are arranged in the descending order in correspondence to the arrangement of the components of x in the ascending order. The nth largest component of $\alpha$ i.e. $\Delta\alpha_n$ is placed at the position corresponding to the position of the nth smallest component of x to form the vector $a_2$.

(3) The vectors $a_1$ and $a_2$ are obtained for all the eigenvectors. An equation $||U||^2 = {}^t\alpha \cdot R \cdot \alpha$ is calculated for each case. The vector that makes $||U||^2$ minimum among all the vectors $a_1$ and $a_2$ is selected as $\alpha$ ( steps ST4 and ST5 ).

Finally, the stacks 2 are arranged according to the components of the $\alpha$ that makes $||U||^2$ minimum and the stacks 2 are stuck together (step ST6).

Figure 1A:
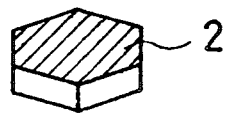
FIG. 1 is a perspective view of a reflecting mirror.
Figure 1B:
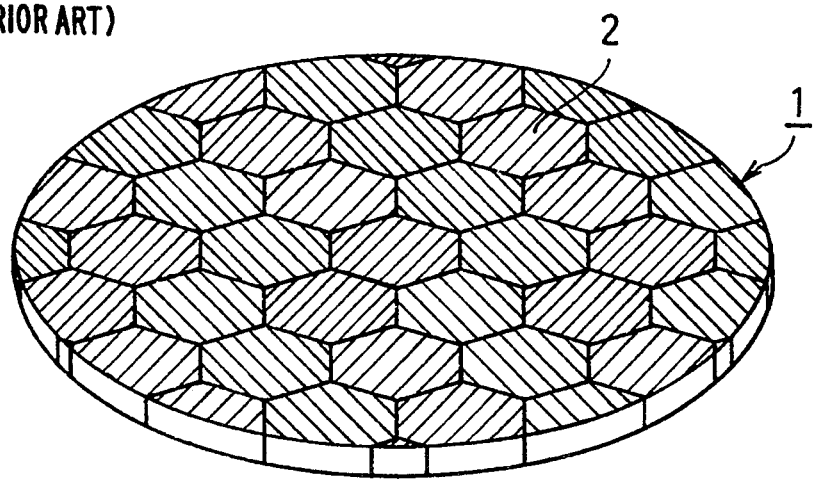
Figure 6:
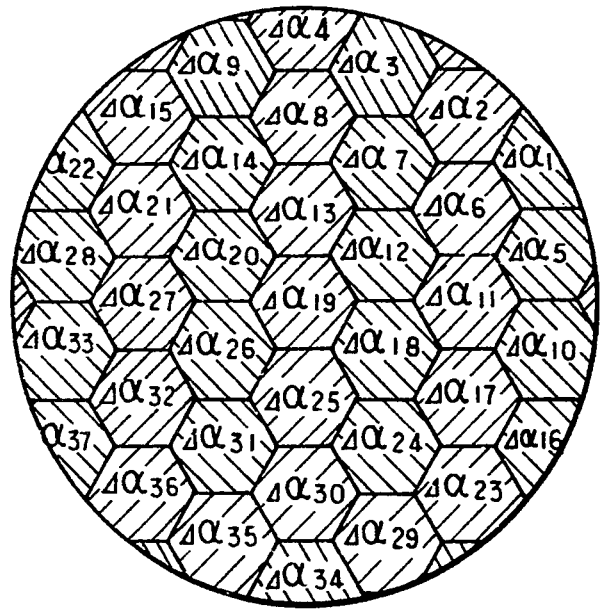
FIG. 6 is a plan view showing the arrangement of the stacks of the reflecting mirror shown in FIG. 5.
Figure 2:
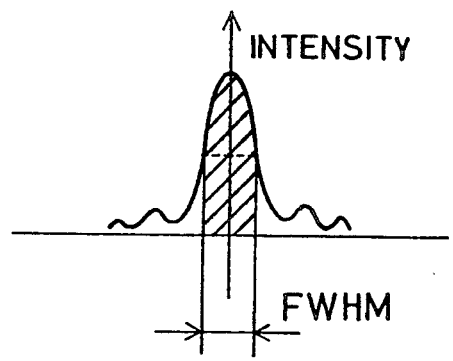
FIG. 2 is a diagram showing light intensity distribution in a stellar image formed by a reflecting mirror which is not deformed.
Figure 3A:
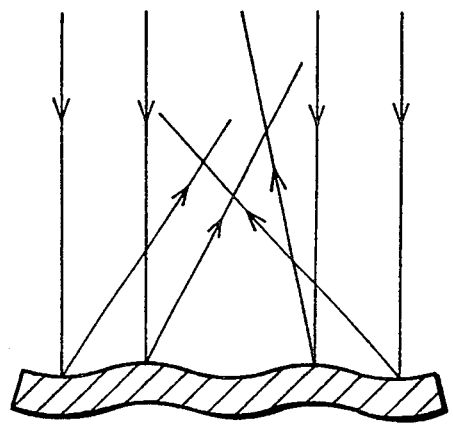
FIG. 3 is a sectional view of a deformed reflecting mirror and a diagram showing light intensity distribution in a stellar image formed by the deformed reflecting mirror.
Figure 3B:
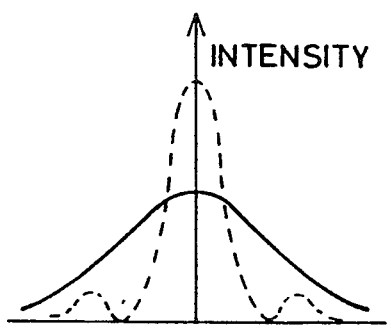
Figure 4:
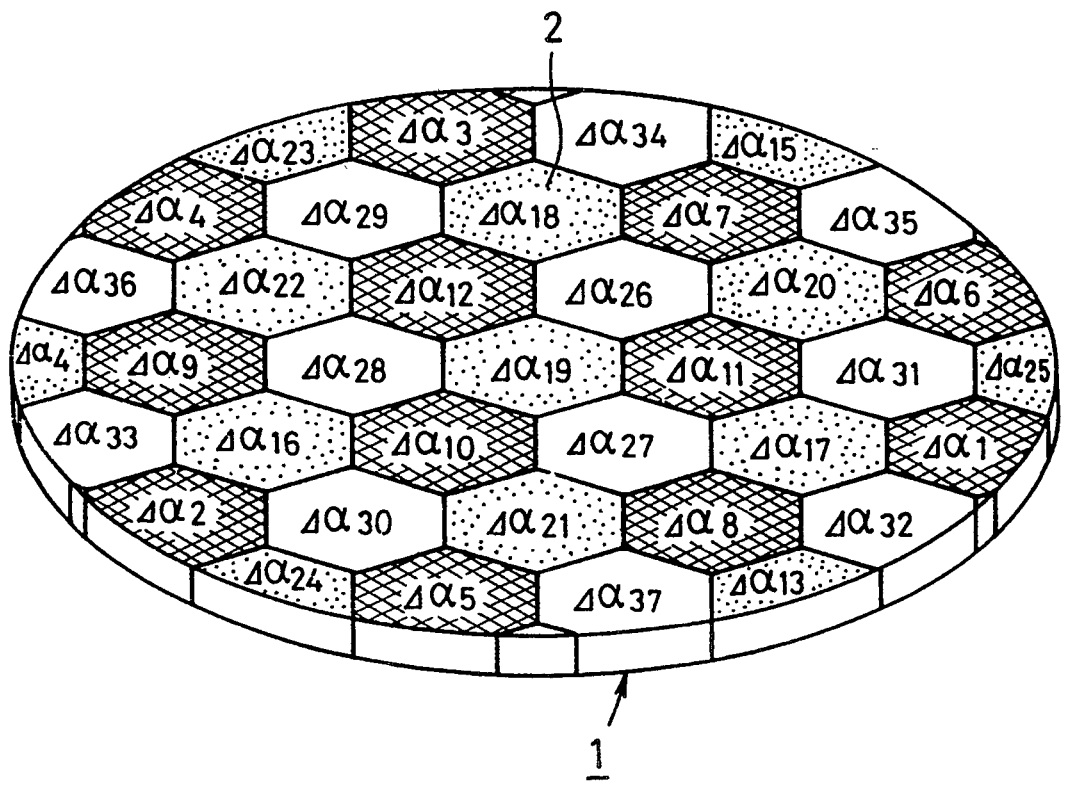
FIG. 4 is a perspective view of assistance in explaining an arrangement of the stacks of a reflecting mirror fabricated by a prior art method of fabricating a reflecting mirror.
Figure 5:
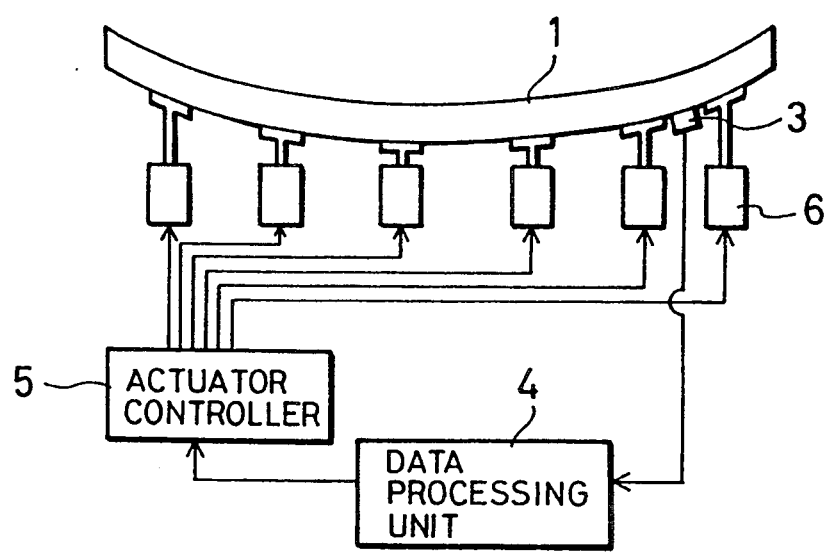
FIG. 5 is a block diagram of a thermal deformation correcting system incorporated into a prior art reflecting mirror.
Figure 10:
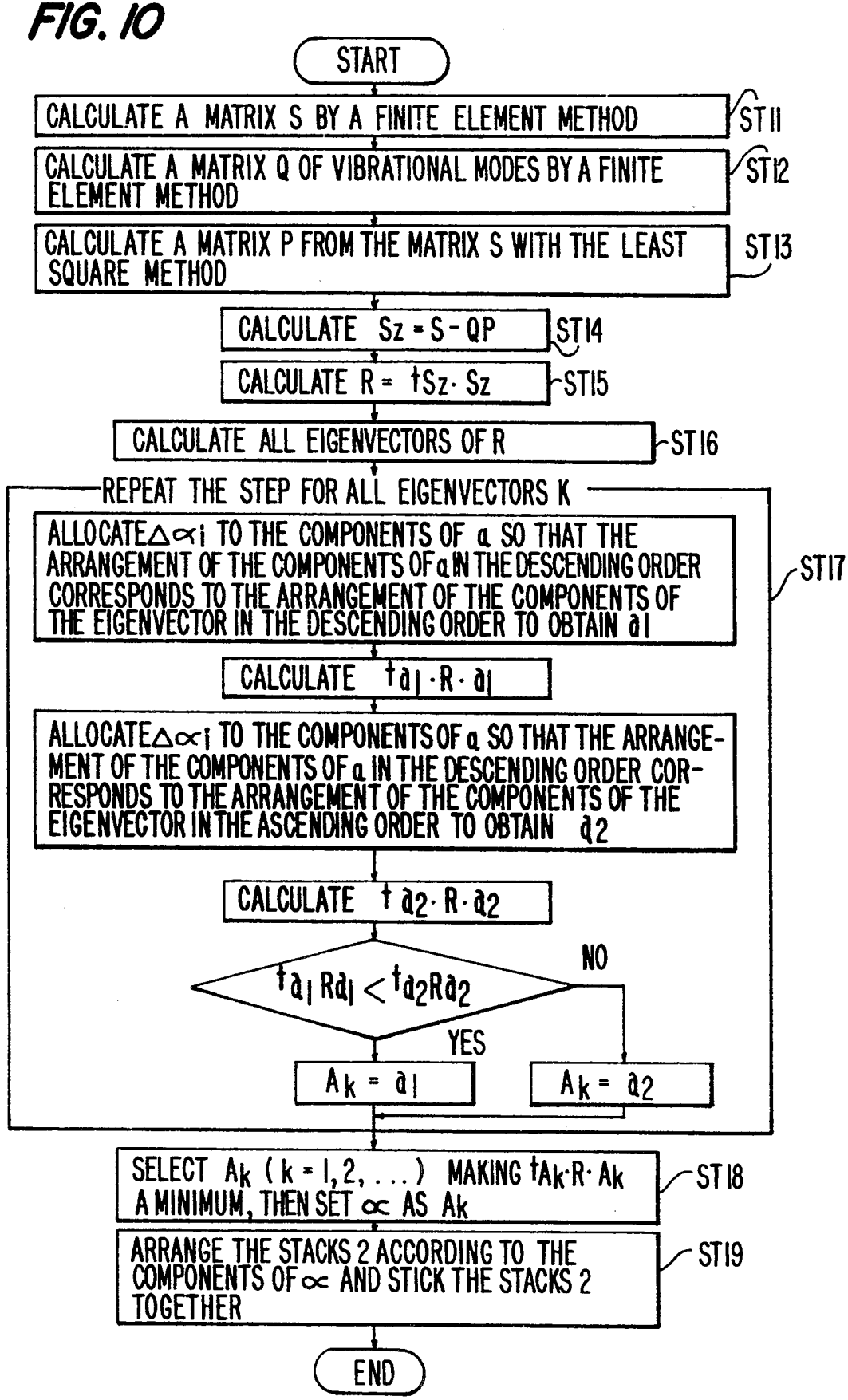
FIG. 10 is a flow chart of assistance in explaining steps of a method of fabricating a reflecting mirror in a second embodiment according to the present invention.

A method of fabricating a reflecting mirror in a second embodiment according to the present invention will be described hereinafter with reference to a flow chart shown in FIG. 10. In the second embodiment, thermal deformation is subjected to modal expansion, and stacks 2 are arranged so that residual deformation remaining after the correction of predetermined terms is reduced to a minimum. That is, the arrangement of the stacks 2 is determined so that the residual deformation remaining after the correction of deformation by the correcting system shown in FIG. 5 is minimum.

As mentioned above, the relation between a displacement vector U and a thermal expansion coefficient vector $\alpha$ is expressed by $$U = S \cdot \alpha \cdot \Delta T$$

and the residual deformation is obtained by subtracting a correction from the displacement vector U. Accordingly, the relation between the residual deformation and the CTE vector $\alpha$ is determined from the relation between the correction and the CTE vector $\alpha$.

What kind of modes and/or how many modes to be corrected should be determined from various considerations such as calculation time and the maximum force that actuators are allowed to act to the reflecting mirror 1.

Now, we explain hereinafter the example that the thirty-two vibrational modes are corrected.

Figure 9:
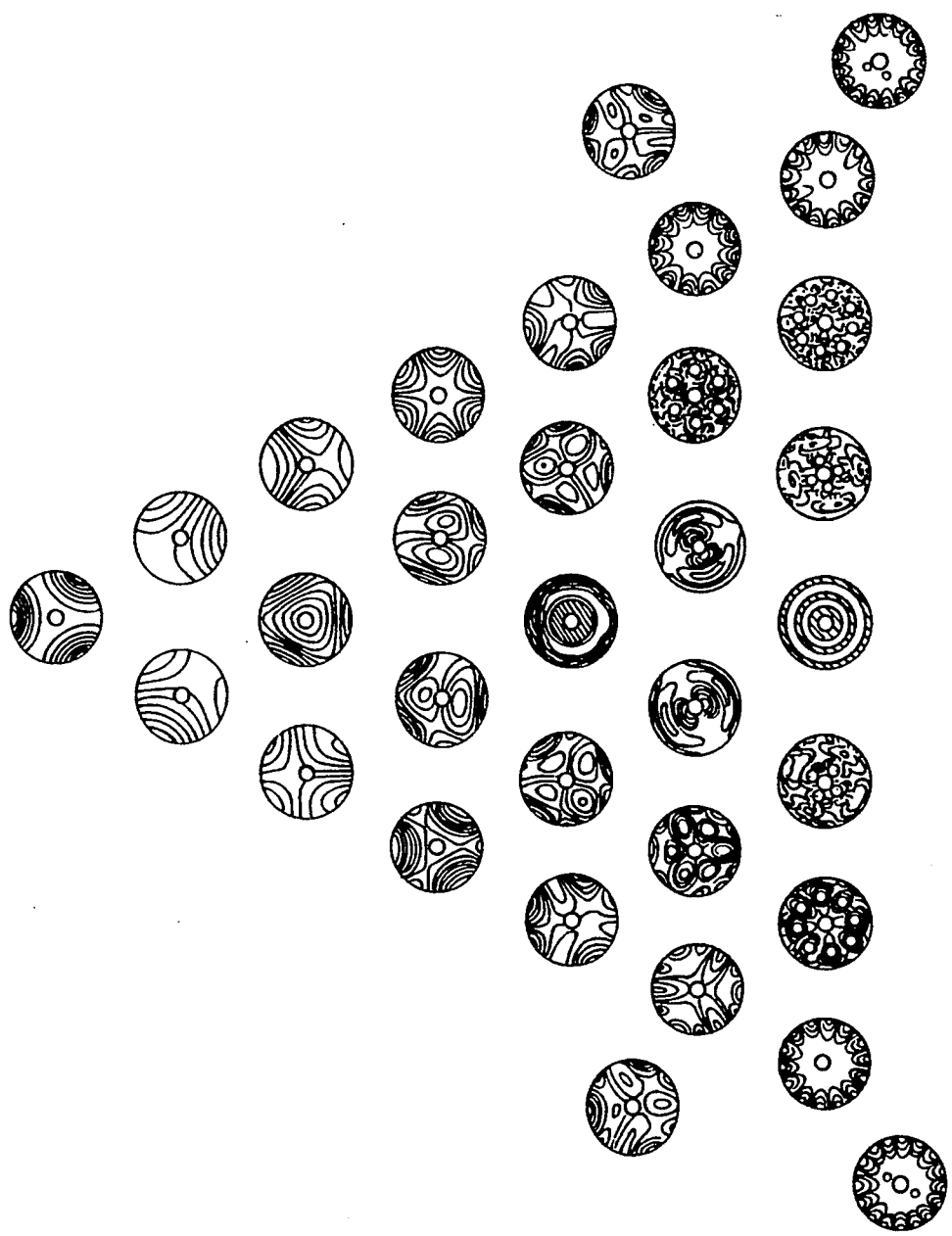
FIG. 9 is plan views of contour lines in eigenmodes.

The displacement vector U can be expressed by the superposition of infinite items of natural vibration modes. The natural vibration modes can be calculated by a finite element method. FIG. 9 shows examples of patterns of natural vibration modes. A deformation pattern $q_m$ of the m-th eigenmode is represented by the displacement $q_{mi}$ of the same coordinate point as the displacement vector U by an expression (11).

$$q_m = \begin{vmatrix} q_{m1} \\ q_{m2} \\ \cdot \\ \cdot \\ \cdot \\ q_{m1000} \end{vmatrix}$$

The displacement vector U is expressed by the superposition of eigenmodes.

$$U = \begin{vmatrix} \Delta Z_1 \\ \Delta Z_2 \\ \cdot \\ \cdot \\ \Delta Z_{1000} \end{vmatrix} = A_1 \times \begin{vmatrix} q_{11} \\ q_{12} \\ \cdot \\ \cdot \\ q_{1,1000} \end{vmatrix} + A_2 \times \begin{vmatrix} q_{21} \\ q_{22} \\ \cdot \\ \cdot \\ q_{2,1000} \end{vmatrix} + \ldots$$

Therefore $$U = \sum_{m=1}^{\infty} (A_m \times q_m)$$

where $A_m$ are expansion coefficients.

Now, we consider the case that first to the thirty-second modes among those infinite modes are corrected.

$$\text{Correction} = \sum_{m=1}^{32} (A_m \times q_m)$$

When A and Q are expressed by $$A = \begin{vmatrix} A_1 \\ A_2 \\ \cdot \\ \cdot \\ A_{32} \end{vmatrix}$$

$$Q = [q_1, q_2, \ldots, q_{32}]$$

$$= \begin{vmatrix} q_{1,1} & q_{2,1} & q_{32,1} \\ q_{1,2} & q_{2,2} & q_{32,2} \\ \cdot & \cdot & \cdot \\ \cdot & \cdot & \cdot \\ q_{1,1000} & q_{2,1000} & q_{32,1000} \end{vmatrix} \quad (1000 \times 32 \text{ matrix})$$

Correction=Q·A. The elements of the matrix Q are calculated by a finite element method (step ST12).

Incidentally, the CTE vector α and the displacement vector U are related to each other in a linear relation as expressed by the expression (4), the displacement vector U is also related linearly to the expansion coefficient A, and hence the CTE vector α and the expansion coefficient A are in a linear relation to each other. Accordingly, the relation between the CTE vector α and the expansion coefficient A can be expressed by the following expression by using a matrix P.

$$\begin{vmatrix} A_1 \\ A_2 \\ \cdot \\ \cdot \\ A_{32} \end{vmatrix} = \begin{vmatrix} P_{1,1} & \ldots & P_{37,1} \\ P_{1,2} & & \cdot \\ \cdot & & \cdot \\ \cdot & & \cdot \\ P_{1,32} & & P_{37,32} \end{vmatrix} \times \begin{vmatrix} \alpha_1 \\ \alpha_2 \\ \cdot \\ \cdot \\ \alpha_{37} \end{vmatrix} \times \Delta T \quad (11)$$

The first row of the matrix P is calculated as the expansion coefficients obtained by expanding the first row of the matrix S. The mode expansion is calculated by the least square method. The second row of the matrix P can be calculated from the second row of the matrix S in the similar manner (step ST13).

Thus, the correction Q·A can be related to the CTE vector α as follows.

$$Q \times A = A \cdot P \cdot \alpha \cdot \Delta T$$

Therefore, a residual deformation vector $U_z$ can be determined by subtracting the correction from the displacement vector U (step ST14).

$$U_z = U - Q \cdot P \cdot \alpha \cdot \Delta T = S \cdot \alpha \cdot \Delta T - Q \cdot P \cdot \alpha \cdot \Delta T$$
$$= (S - Q \cdot P)\alpha \cdot \Delta T$$

Substituting $S_z$ for $S-Q \cdot P$, we obtain $$U_z = S_z \cdot \alpha \cdot \Delta T$$

Thus, an optimum arrangement can be determined by the second embodiment like the first embodiment by using the residual deformation vector $U_z$ instead of the displacement vector U employed in the first embodiment and using $S_z$ instead of S employed in the first embodiment. The rest of the procedure is the same as that of the first embodiment, and hence the description thereof will be omitted.

Although the first and second embodiments use the deviations of the CTEs of the stacks 2 as the components of the CTE vector α to minimize the thermal deformation of the reflecting mirror 1 or the residual thermal deformation remaining in the reflecting mirror 1 after the correction of the thermal deformation in fabricating the reflecting mirror 1, the use of the gradients of the CTE with respect to the direction of thickness of the stacks 2 as the components of the CTE vector α will provide the same effects.

Figure 11:
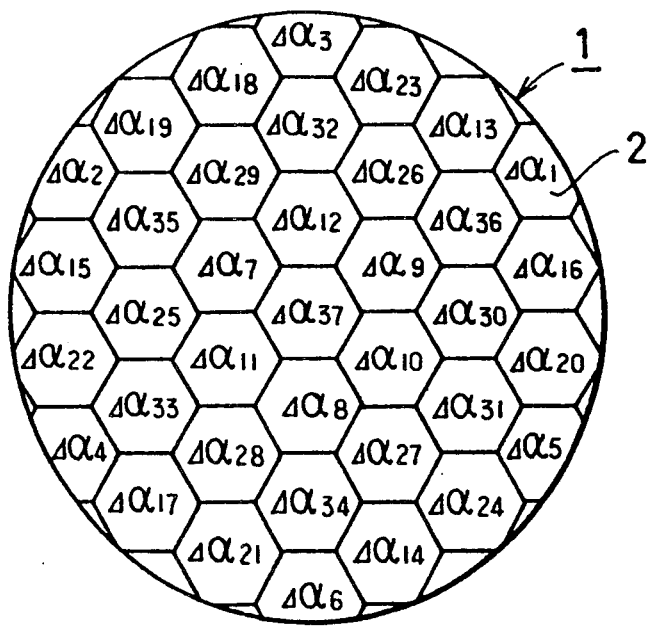
FIG. 11 is a plan view showing the arrangement of the stacks of a reflecting mirror fabricated by a method embodying the present invention.

FIG. 11 shows an arrangement of stacks making the residual deformation remaining after the correction of the first to thirty-second eigenmodes of the thermal deformation minimum when the gradients of the CTE of the stacks 2 with respect to the direction of thickness of the stacks 2 are used as the thermal expansion coefficient vectors α.

In FIG. 11, reference characters $\Delta\alpha_1$ to $\Delta\alpha_{37}$ ($\Delta\alpha_1 \geq \Delta\alpha_2 \geq \ldots \geq \Delta\alpha_{37}$) marked on the stacks 2 indicates the gradients of the CTE of the stacks 2 with respect to the direction of thickness of the stacks 2.

As is apparent from the foregoing description, the method of fabricating a reflecting mirror according to the present invention calculates the sum of squares of the components of the CTE vector by using the arrangement of the components of the CTE vector in a descending order or in an ascending order in correspondence to the arrangement of the components of each eigenvector of the symmetric matrix of the matricial equation for each eigenvector, and the stacks are arranged and stuck together according to the components of the CTE vector which makes the sum of squares of the components of the displacement vector or the residual deformation vector minimum. Thus, an optimum arrangement of the stacks can be determined analytically, which ensure the fabrication of a reflecting mirror having the least possible thermal deformation or the least possible residual deformation after correction.

What is claimed is:

1. A method of fabricating a reflecting mirror by sticking a plurality of mirror segments together, said method comprising steps of:

developing a matrix expressing the relation between the displacements of a plurality of sample points on the mirror surface of the reflecting mirror and coefficient of thermal expansion (CTE) vector having the respective CTE values of the mirror segments as components corresponding respectively to the positions of the mirror segments;

selecting a vector among those obtained by rearranging the components of the CTE vector, so as to make the sum of squares of the displacements minimum;

arranging the mirror segments according to positions represented by the components of the selected CTE vector; and sticking the mirror segments together.

2. A method of fabricating a reflecting mirror according to claim 1, wherein the step of selecting the vector making the sum of squares of the displacements minimum comprises steps of:

calculating the eigenvectors of a matrix corresponding to the product of a matrix expressing the relation between the displacement vector having as components displacements of a plurality of sample points on the mirror surface of the reflecting mirror and CTE vector, and the transposed matrix obtained by transposing the former; and calculating the sum of squares of the displacements for each eigenvector by using the vector having the nth (n=1 to the number of the mirror segments) largest component among those of the CTE vector, placed at the position corresponding to the place where the nth largest component among those of the eigenvector is placed, calculating the sum of squares of the displacements by using the vector having the nth largest component among those of the CTE vector, placed at a position corresponding to the position where the nth smallest component among those of the eigenvector is placed, and selecting the vector corresponding to the smallest sum of squares among the calculated sums of squares.

3. A method of fabricating a reflecting mirror according to claim 1 or 2, wherein the values connected with the CTEs of the mirror segments are the deviations of the respective CTEs of the mirror segments from the average CTE obtained by averaging the thermal expansion coefficients of all the mirror segments.

4. A method of fabricating a reflecting mirror according to claim 1 or 2, wherein the values connected with the respective CTEs of the mirror segments are the gradients of the respective CTEs of the mirror segments with respect to the direction of thickness of the mirror segments.

5. A method of fabricating a reflecting mirror formed by sticking a plurality of mirror segments together and to be subjected to predetermined deformation correction, said method comprising steps of:

developing a matrix connecting a residual displacement vector representing residual displacements at a plurality of sample points on the mirror surface of the reflecting mirror remaining after the correction of predetermined terms among those of series representing the thermal deformation of the reflecting mirror, and CTE vector having components corresponding to values connected with the CTEs of the mirror segments and corresponding to positions where the mirror segments are placed;

selecting a vector making the sum of squares of the components of the residual displacement vector a minimum among those obtained by rearranging the components of the CTE vector; and arranging the mirror segments according to the positions of the components of the selected vector, and sticking the mirror segments together.

6. A method of fabricating a reflecting mirror according to claim 5, wherein said step of developing the matrix comprises steps of:

developing a matrix Q representing the deformation patterns of each term of the series used to correction of the mirror deformation for each sample point;

developing a matrix P connecting the amplitude vector representing the amplitude of each term of the series as components with the CTE vector; and developing the matrix connecting the residual deformation vector with the CTE vector by using a matrix connecting the displacement vector representing the displacements before a correction of the thermal deformation of the mirror with the CTE vector, and the matrices Q and P.

7. A method of fabricating a reflecting mirror according to claim 5, wherein the step of selecting the vector making the sum of squares of the components of the residual displacement vector minimum comprises steps of:

calculating the eigenvectors of a matrix corresponding to the product of a matrix connecting the residual displacement vector with the CTE vector, and a transposed matrix obtained by transposing the former; and selecting the vector corresponding to the smallest sum of squares among the sums of squares of the components of the residual displacements calculated by using the vector having the nth (n=1 to the number of the mirror segments) largest component placed at a position corresponding to the position of the nth largest component of each eigenvector, and by using the vector having the nth largest component of the CTE vector placed at the position corresponding to the position of the nth smallest component of the eigenvector.

8. A method of fabricating a reflecting mirror according to any one of claims 5 to 7, wherein the values connected with the CTEs of the mirror segments are the deviations of CTEs of the mirror segments from the average thermal expansion coefficient obtained by averaging the CTE of all the mirror segments.

9. A method of fabricating a reflecting mirror according to any one of claims 5 to 7, wherein the values connected with the CTEs of the mirror segments are the gradients of the respective CTEs of the mirror segments with respect to the direction of thickness of the mirror segments.

* * * * *

UNITED STATES PATENT AND TRADEMARK OFFICE
CERTIFICATE OF CORRECTION

PATENT NO. : 5,353,231

DATED : October 4, 1994

INVENTOR(S) : Aki Sasaki et al.

It is certified that error appears in the above-identified patent and that said Letters Patent is hereby corrected as shown below:

Col. 3, line 7, "$\Delta \alpha hd\ 1$" should be --$\Delta \alpha_1$--.

Col. 5, lines 1 and 21, "$\alpha_i$" should be --$\alpha_1$--.

Col. 6, line 27, "$\Delta \alpha;$" should be --$\Delta \alpha_i$--.

Col. 6, line 30, "$\Delta \alpha_i$" should be --$\Delta \alpha_1$--.

Col. 6, line 36, after "component" insert --of x.--. Then start a new paragraph.

Col. 7, line 16, "$\Delta \alpha;$" should be --$\Delta \alpha_1$--.

Signed and Sealed this

Twenty-first Day of March, 1995

Attest:

BRUCE LEHMAN

*Attesting Officer*     *Commissioner of Patents and Trademarks*